March 20, 1962 — E. P. LATHUY — 3,025,690

DEVICES FOR AGITATING AND EJECTING LIQUIDS AND THE LIKE

Filed May 2, 1957 — 5 Sheets-Sheet 1

Inventor
E. P. Lathuy

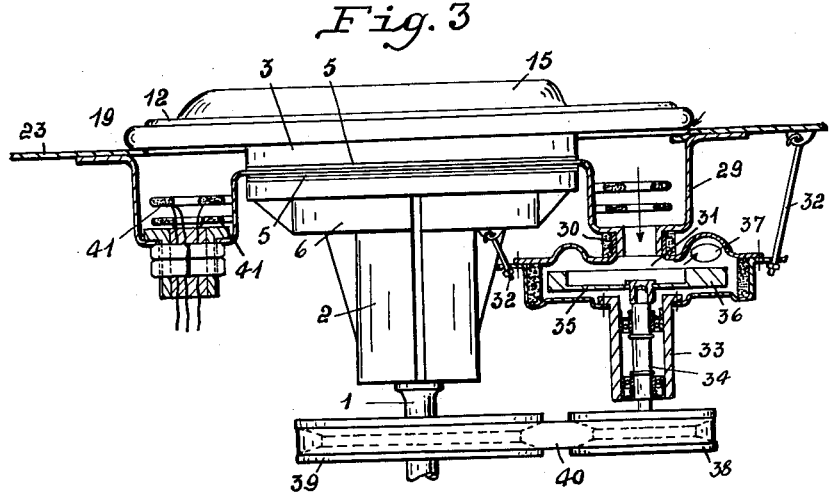
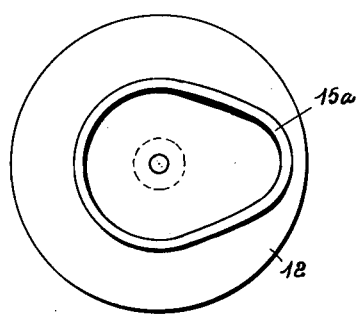
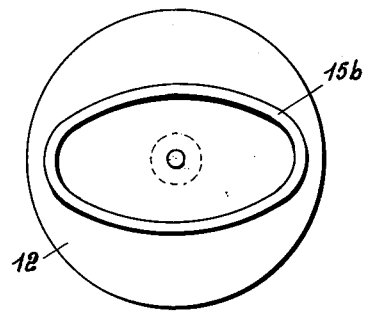
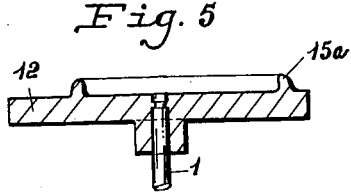
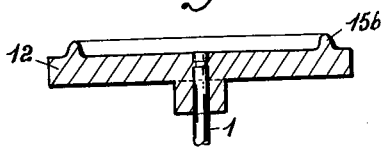

March 20, 1962 E. P. LATHUY 3,025,690
DEVICES FOR AGITATING AND EJECTING LIQUIDS AND THE LIKE
Filed May 2, 1957 5 Sheets-Sheet 3

Inventor
E. P. Lathuy
By Glascock Downing Seebold
Attys

March 20, 1962 E. P. LATHUY 3,025,690
DEVICES FOR AGITATING AND EJECTING LIQUIDS AND THE LIKE
Filed May 2, 1957 5 Sheets-Sheet 4

Inventor
E. P. Lathuy
By Glascock Downing Seebold
Attys.

March 20, 1962  E. P. LATHUY  3,025,690
DEVICES FOR AGITATING AND EJECTING LIQUIDS AND THE LIKE
Filed May 2, 1957  5 Sheets-Sheet 5

United States Patent Office 3,025,690
Patented Mar. 20, 1962

3,025,690
DEVICES FOR AGITATING AND EJECTING
LIQUIDS AND THE LIKE
Eugene Pierre Lathuy, 123 Rue de la Raperie,
Eghezee, Belgium
Filed May 2, 1957, Ser. No. 656,709
Claims priority, application Belgium May 5, 1956
3 Claims. (Cl. 68—134)

The present invention relates to gyrostatic equipment which is used for agitating liquids and other media of weak cohesion to bring the same to a state of vibration and, more especially for setting up in a container strong and rapid currents in various possibly alternating directions, such as is the case in certain types of washing machines and other domestic electrical appliances. The kind of equipment according to the invention can also be used to advantage in the construction of certain pumps.

In particular, as far as washing machines are concerned, up to the preesnt time the tendency has been to use the circular rotary equipment in which the gyrostat—whether it is called a pulsator, gyrowasher, turbulator or the like—imparts to the liquid in which in operates, a series of differing and opposing movements brought about by either radial variations or by protuberances of greater or lesser regularity on its working surface, thereby promoting the working turbulence and thus the succession of increased and reduced pressure within the liquid which is so efficacious in the laundering action.

In washing machines in which use is made of a pulsator—which, incidentally, has the drawback of having to rotate at an appreciably reduced speed—the stirring action which moves the clothes around is due to the centrifugal pump action which gives the mass a continuous cyclic action, since all the mass of liquid passes through the center of the pulsator and is expelled by its periphery under the action of centrifugal force, a process which brings about a constant and even displacement of the liquid, the same liquid returning after a certain period of time to recommence the cycle. This cyclic movement is counter-acted by the shape given to the tub, and it is this movement which causes the linen to pass—more or less regularly—into the effective washing area situated immediately around the pulsator.

Machines of this type are also open to criticism on account of the amount of time they require to do the job by reason of the swirling cyclonic central column brought about by the gradual molecular impulse and the movable suction force; this swirling action is very rapid in the extension of the rotary driving axis and is in fact responsible for the inert twisting created in the linen just as it is for the ultimate rolling up into a series of multiple twists. When this occurs, the turbulent action is hardly effective any longer in the center of the mass of linen which is rolled up into a ball, and this multiple twisting which occurs subjects the laundry to the danger of being violently dragged by the pulsator's unevenness owing to the inertia of this mass in the water, thus subjecting the linen to premature wear and tear. This wear and tear factor also arises—and perhaps to an even greater extent—by reason of the suction action on the free—i.e. floating—linen and the violent suction of the detergent liquids through the fibers of the linen against the unevenness of a mechanical rotary member in the pulsator's feed area, this suction being in fact of greater strength the nearer the center and of maximum strength in the hollow where the pulsator's uneven sections commence. This suction is very great in terms of unit surface area considered at various points on the pulsator's surface because the actual feed area is less in relation to the pulsator's apparent total surface area.

The grave drawback of this premature wear on the linen caused by pulsators is further accentuated by the greater the weight of laundry being washed in comparison with the volume of liquid used, and so it is seen that pulsator machines require a relatively large amount of water and a proportionate amount of diluted soap.

Attempts have been made to obviate these disadvantages by equipping the pulsator's uneven portions with specially designed profiles but it has been established that, with the elimination of one drawback, other—no less serious ones—have arisen, such as an exaggerated or an insufficient turbulence, insufficient stirring action, or a too strongly marked twisting.

As far as other applications of agitators of liquids or other weak cohesion media are concerned with a view to using them in certain domestic electrical appliances, most of the high-speed rotary agitators do not provide a "to and fro" movement and they have a tendency to splash by throwing out the articles being treated.

An object of the present invention is to overcome the disadvantages indicated in the foregoing by producing an appliance for agitating and ejecting liquids and other media which really ensures thorough laundering conforming to the technical requirements in so far as these relate to the absence of twisting up the linen, the elimination of wear, and the speed of operation working with a minimum of water and detergents.

A further object is to provide an agitator for other applications such as, for example, emulsifiers, mixers, grinders and domestic electrical appliances.

A further object is to provide an ejector of liquid matter by way of further applications in the form of a pump.

In order to determine precisely the scope of the present invention, it is necessary to be understood that, in the course of the description which now follows, the term "plate" is used to describe any fairly round body the upper face of which, which constitutes its working surface, may be curved—concave or convex—conical or shaped like a truncated cone—regular or irregular—and is generally opposed to the rotary driving shaft on which it is mounted—preferably in a perpendicular fashion, and that the term "unevenness" means any irregularity or contouring of the said working surface constituting an appreciable change—be it a hollowing out or a relief on the said surface, such as a projecting ribbing on, or a grooving below the plate's surface, and which is of an elongated arched shape and of any desirable section, constant or otherwise, or in the shape of a cup, centered or otherwise. The term irregular surface is used to denote the above-mentioned arrangement while the term "ring" means any unevenness, whether it takes the form of an arched or elongated member, closed or otherwise, interrupted or not, and being, for example circular, oval, elliptical, spiral shaped or of similar form, the average diameter of the ring being half the sum of the smallest and the largest axis calculated on the outside edge, this ring also being able to be constituted by a cup having a raised edge and joined to the surface of the plate, the edge in question taking the form of a more or less ring-shaped projection.

In a general fashion the appliance conforming to the invention is characterised in that the gyrostat which is employed in a liquid or viscous mass or in other media contained in a tub, comprises, integrally mounted on the end of its rotary driving shaft, a circular plate the working surface of which is fitted with at least one unevenness or difference in level in the form of a ring which has an average diameter appreciably greater than the radius of the plate or disc, and surrounds the axis of rotation of the latter at a variable distance, thus forming a constant and large region representing the zone of admission of the liquid, and a smaller region located in the most remote portion in relation to the axis of rotation, representing the zone of tangential ejection of the liquid.

From a practical point of view, in its most advantageous form the gyrostat is constituted by a rotary plate on to which is applied, directly, in an appropriate eccentric cavity of the latter, the unevenness or ring consisting of a disc stamped so as to have on its periphery a projection of a substantially trapezoidal section, the inclined outer wall of which is joined to that of the plate, which, itself, is enclosed over its entire periphery by a stator cup centrally fitted to a support carrying the plate's driving shaft and supported by a wall of the machine's tub. It should be noted that the appliance conforming to the invention can be assembled, centrally or otherwise, perpendicularly or inclined in relation to the fixing wall, the appliance being able to be fixed on the bottom of the tub or on a side wall of the latter or suspended upside down above the tub.

In view of its centering and the manner in which it is driven, the gyrostat's plate is centrally gripped between a centering member freely mounted on the motor shaft and a nut recessed into the latter and screwed on to the threaded end of the said shaft to give an automatic clamping together of the gyrostat's constituent parts, and a safety pin carried by the said nut passing freely through both the rotary plate and the centering member.

Depending on the gyrostat's shape and the manner in which it is arranged, it may or may not have to undergo an appropriate balancing. In the case of the embodiment just mentioned, this balancing is obtained by fitting to the interior of the projection or ring, at a well chosen location, a piece of metal or other material of appropriate shape and weight. Incidentally, in a general manner the balancing may be obtained by providing the plate with a groove the shape and position of which will, obviously, depend on the ring's profile, it being obvious that no kind of balancing will be of any use in cases where for example the ring is oval or of elliptical shape.

As has already been stated, the appliance conforming to the invention is also capable of application to certain pumps, used either as an independent pump or as an auxiliary pumping means, for instance, in a washing machine fitted with a gyrostat conforming to the invention or otherwise, as an agitator means.

The invention will be further described with reference to the accompanying drawings—presented by way of example—of various embodiments of an appliance conforming to the invention. In the drawings:

FIGURE 3 shows, in view and in section—both partial—the adaption of a pump conforming to the invention, in a washing machine fitted with the agitator gyrostat represented in FIGURES 1 and 2.

FIGURES 4 to 15 represent, respectively and schematically in plan and section, plates of gyrostat appliances fitted with ring-shaped unevennesses of various profiles and shapes.

Figure 1:
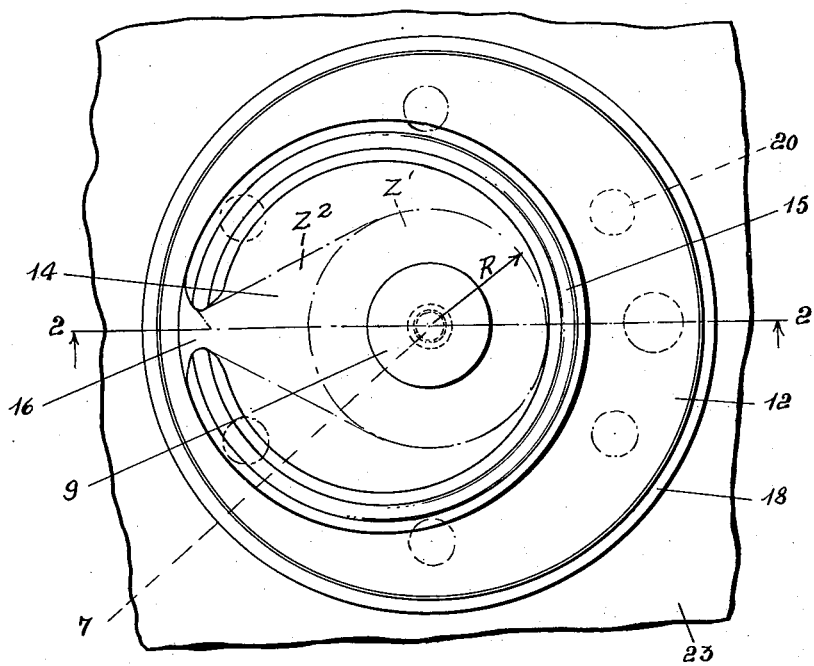
FIGURES 1 and 2, show respectively, a partial plan view and a vertical axial section of the agitator/ejector appliance, which is assumed to be mounted on the bottom of a tub of a machine for washing clothes with FIGURE 2 being taken along the line 2—2 of FIGURE 1.
Figure 2:
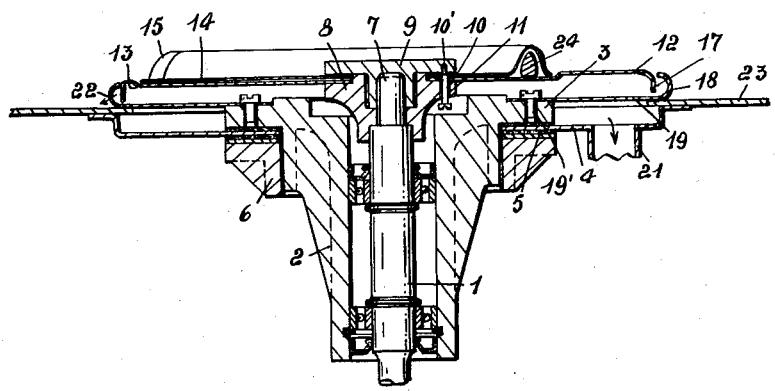

In the embodiment as represented in FIGURES 1 and 2, the reference numeral 1 designates the driving shaft of the gyrostat which is directly driven by an electric motor or through the intermediary of an appropriate transmission carried by the working chamber of the washing machine. This shaft 1 is carried by means of sleeves, gaskets and ball-bearings, by a support 2 the upper part of which has a rim 3 bearing on the bottom of a cup 4 which is clamped, by way of joints 5, between this rim and a ring 6 screwed on a threaded part of support 2. Cup 4 is designed to be welded for example to the bottom of a washing machine tub which is cut away accordingly as shown by 23, although it could easily constitute the actual bottom of the said tub.

Shaft 1 terminates above support 2 in a threaded end 7 and carries freely a centering piece 8 hollowed out centrally around the latter. On the flat upper portion of piece 8, the gyrostat is clamped by means of a smooth-headed nut 9 screwing on to the threaded end 7 inside piece 8. Projecting below the lower face of the head of nut 9 is a safety pin 10 which, passing through a hole drilled in the gyrostat passes freely into an appropriate drilling 11 of centering piece 8, the pin 10 having a screwhead 10' enabling the components to be assembled. Thus, because of the free mounting of centering piece 8 and the action of the safety pin, an automatic centering of the gyrostat is achieved as well as providing the drive of same by shaft 1.

In the construction according to FIGURES 1 and 2, the gyrostat is constituted by a plate 12 whose flat surface is stamped so as to form a rotor cup 13 which is eccentric in relation to shaft 1. Inside this cup 13 is applied a disc 14, the periphery of which is press-stamped to form the unevenness or irregularity which is the object of the present invention, that is to say, a smooth annular projection or ring 15 of a substantially trapezoidal section having a breach or channel 16 corresponding to the largest radius of projection 15 which is off-center as is cup 13 of plate 12 (FIGURE 1). On its outer periphery, projecting ring 15 makes a joint with the latter's surface, to which, indeed, it might be welded.

On its periphery, plate 12 has a turned-over edge 17 towards which, with a very slight clearance so as to prevent solid elements contained in tub 23 penetrating beneath it, converges the curved rim 18 of a stator cup 19 which is cut out centrally so as to be fitted by screws 19' to the upper part of rim 3 of support 2. This cup 19 is drilled with holes 20 (FIGURE 1) which allow the liquid and other elements to pass into cup 4 and be evacuated by an outlet pipe 21 with which the latter is fitted. With the same object in mind, outlet holes 22 are drilled in the curved edges 18 of cup 19.

The mounting of support 2 in a cup 4 distinct from the actual bottom of wash-tub 23 or on the bottom itself is generally effected in such a manner that it and the drive shaft 1 are perpendicular in relation to the bottom of the tub.

In this form, the gyrostat is balanced by fitting in a suitable manner inside hollow circular projection 15 a metal or similar rod 24, the weight and position of which will be appropriately calculated.

The appliance such as has just been described functions in the following manner:

Assuming, in the case of a washing machine, the tub to be filled with liquid, plate 12 and its ring 15 are subjected to a rapid rotary movement, such as, by direct drive from an electric motor. As a result of this rotation, particles of liquid located in ring 15 are driven by centrifugal force in the radial and rotational direction towards the most distant region of the ring in relation to the axis of rotation. These particles escape in a powerful jet, passing through channel 16 fashioned in the ring, moving—depending on the tangent at this point— towards the wall of the washing machine tub. If the channel 16 was not provided, the jet would pass over the edges of the ring at the point of greatest rotational radius.

The escape of these particles brings about, by its rate of flow just as much as by its active force a strong rise in pressure which sets up a swirling movement of the mass of liquid in the tub. Then by discharging a quantity of liquid non-stop into the mass of the tub, not only is a swirling movement set up but also a rising spiral movement. This results in a feeder flow being set up in a downward direction in the middle portion, thus closing the cycle.

As the thin streams of liquid descending vertically towards a fairly large zone limited by the circle having as its radius the shortest distance from shaft 1 to ring 15, the speed of descent is extremely slow in relation to the jet's exit velocity. In the same way, the section of flow of the central feed portion is very large compared with the jet's flow section. The result of this is that the reduction in pressure per unit of surface in the central portion is extremely small in relation to the increase in pressure and to active force of the exit jet per same unit of surface. This jet leaves ring 15 practically at the latter's peripheral velocity. Thus, the invention's chief object is realized, that is, the elimination of the exaggerated rotative pressure reductions per unit of surface, as well as the elimination of the swirl feeding the pulsators.

In cases, where, as in the example described, the ring is in relief, in front of the movement of the ring and externally to the latter, are produced a compression and a depression behind this movement. This gives rise to an alternation of compressions and depressions in rhythm with the rotation of the motor, the effect of which is to put into powerful vibration all the portion of the liquid situated outside ring 15 in a zone shaped like a circular crown having as a small radius the shortest distance from ring 15 to shaft 1 and as a large radius the longest distance. The vibratory agitation which results from this and which is extremely powerful, gradually communicates itself in a zone largely spread out in the plane of the ring.

The discharge from the outer compression zone to the ring superimposes itself on the jet delivery from this ring, while the zone of low pressure behind the ring's movement increases the effective surface of the central zone of low pressure.

In the particular instance where the unevenness provided at the side of the plate's active surface is hollow, a rapid alternating movement occurs vertically due to the alternating passage of compressions and depressions in the circular crown defined above, whereas the delivery of the jet coming from the middle portion functions in the same manner as previously mentioned.

Under these conditions an agitation and an ejection of liquid or other elements is achieved according to the object of the invention. Thus, in the case of a washing machine, if laundry is placed in the tub, it will be seen that it moves down slowly without getting twisted up, towards the ring's inner zone from where it is then ejected just as much by the jet of liquid from the ring as by the centrifugal force proper brought about by this ring's rotation. The laundry passes through the liquid's zone of vibration in which the detergents pass and re-pass rapidly alternately through the fibers of the clothes, making for thorough, rapid cleaning. The clothes follow the cyclic movement so as to present all the surfaces successively in the most active zone of the gyrostat.

The clothes do not receive any frontal shock which might damage the same, all the contacts with the moving member being effected substantially tangentially with a backward and forward movement from the ring against the clothes, as when they are washed by hand. Moreover, the jet of liquid has to pass between the clothes and the smooth, revolving ring, and the effect of which is to amply lubricate any contacts that take place. After having passed through this vibration zone, the clothes follow the spiral ascending current or an equivalent cyclic movement to return in closed cycle with the moving liquid towards the descending column and the same cycle recommences at a frequency sufficient to pass all the fibers of the clothing being laundered in a minimum amount of time.

As has been stated, the appliance conforming to the invention makes it possible to achieve a great saving in water and detergent as a result of the machine's huge activity and its large capacity for stirring the clothes.

The above remarks apply to all possible forms of the invention and in particular to those represented in FIGURES 4 to 15.

Figure 8:
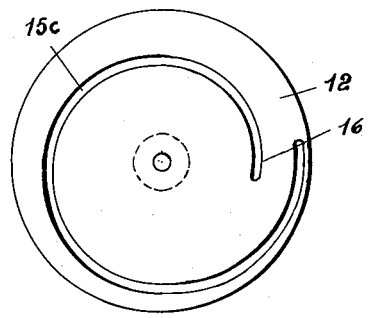
Figure 10:
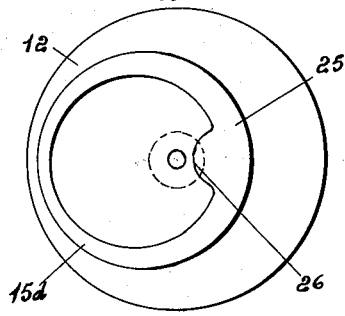
Figure 9:
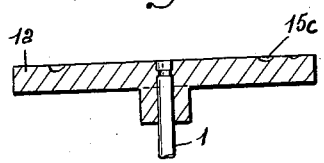
Figure 11:
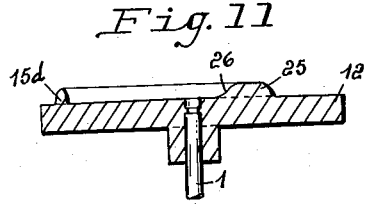
Figure 12:
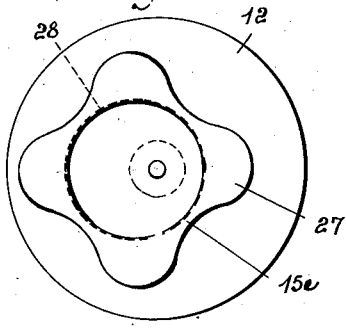
Figure 14:
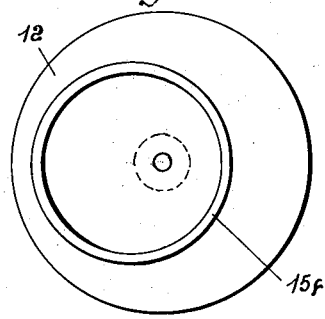
Figure 13:
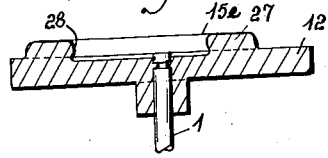
Figure 15:
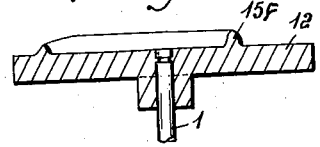

In FIGURE 4, ring 15a has the shape of an egg in relief but is not off-centered, in such a way that, for balancing purposes it is not necessary for account to be taken of the tip of the oval. In FIGURE 6, ring 15b is formed in the shape of a non-eccentric ellipse, and thus no balancing is necessary. In FIGURE 8, ring 15c is constituted by a hollow spiral and by its position it does not necessarily require any special balancing. In FIGURE 10, ring 15d which is in relief and of a generally circular shape, has the pecularity of presenting a progressive-degressive section towards the inside, outer surface 25 remaining circular, and a boss 26 constitutes one particular form of balancing a gyrostat. FIGURE 12 is a view similar to that of FIGURE 10, with rounded contours or lobes 27 being arranged over the outer face of ring 15e, and its inner facing 28 remaining circular in shape. Finally, FIGURE 14 shows a circular ring in eccentric relief 15f, having the shape of a perfect circle.

All of the embodiments illustrated in FIGURES 4 to 9 illustrate the zone of admission Z1 and the zone of ejection Z2, which zones have been described with particularity in connection with FIGURES 1 and 2 and it is believed unnecessary to describe each of such figures in greater detail.

With respect to the nomenclature "average diameter," assuming the unevenness of the ring 15 to be circular and $r$ its radius and $r'$ the radius of the plate 12, the average diameter $(2r)$ of the ring 15 must be greater than $r'$. If an elliptical ring is used, $r''$ being the larger diameter and $r'''$ the smaller diameter, there is of course $$\frac{r''+r'''}{2}$$

larger than $r$. Practically, the center of rotation of the plate 12 must always be inside the ring 15 and obviously if the unevenness has the form of an ellipse or a helix, the distance from the edge of the unevenness to the center of the plate will be periodically variable.

With respect to "tangential zone" the liquid over the plate 12 is subjected to a tangential ejection motion as for rotary pumps, and this ejection occurs in such situations at a determined place on the ring due to the structure of the ring and such zone is identified Z2 in FIGURES 4 to 9.

It can also be seen in FIGURES 4 to 9 that in each instance the zone Z1 is within a circle, the radius of which is the smallest distance between the center of rotation of the plate 12 and the closest point of the unevenness located on or within the plate 12 and the same has been referred to as "zone delimited by the circumference."

It has been stated that the appliance conforming to the invention can be made use of with advantage in pumps. In FIGURE 3 is seen a particular embodiment in which a gyrostat according to the invention serves as a draining pump in a washing machine in which use is also made of a gyrostat as an agitator, which is similar to that in FIGURES 1 and 2 and in which can be seen the drive shaft 1, support 2, the rotary plate 12, ring 15 and the cup-stator 19. In this construction, underneath the cut-out space in the bottom of the tub 23 housing the gyrostat is fitted, partly by welding to the said bottom and partly by press-fit on support 2 by ring 6, a ring-shaped cup 29 taking the liquid from tub 23 by way of orifices fitted between the cup 19 and the bottom of the tub 23. Fitted to a specific point in this cup is a conduit 30 emptying into a pumping chamber 31, supported in the present instance by hooks attached at one end to support 2 and at the other end to tub 23. The base of chamber 31 carries a socket 33, which in the case of support 2 in FIGURE 2 is traversed by a drive shaft 34 the upper end of which carries a gyrostat constituted in the present instance by a simple plate 35 surmounted by a ring in the form of an eccentric cup 36. At the upper part of the chamber, which could be profiled in the form of a volute as in the case fo a centrifugal pump, there is fitted a liquid outlet 37. Drive shaft 34 is driven by a pulley 38 receiving its rotary movement from pulley 39 keyed on to driving shaft 1 and belt driven by belt 40.

It will be readily understood that the liquid passing from tub 23 of the washing machine into cup 29 will be expelled outside by gyrostat 35, 36 functioning like gyrostat 12, 15 in FIGURES 1 and 2. The active force of the jet obtained will be transformed into pressure in the outer part of working chamber 31.

Here, cup 29 can, to advantage, be used to receive ring-shaped electrical resistances such as 41, to allow the liquid to be heated without complicating the constructional design and in this case holes 20 provided in cup-stator 19 will serve as a heat exchanger.

Figure 16:
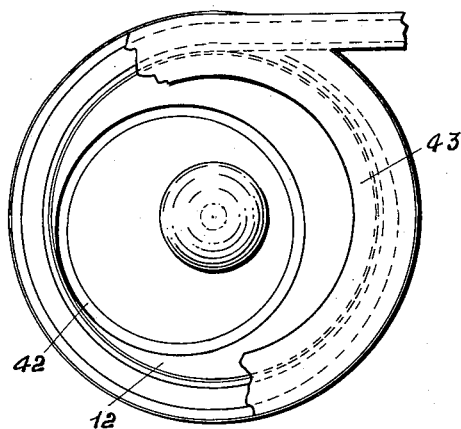
FIGURES 16 and 17 represent in plan and in vertical axial section, a pump gyrostat the plate of which has an irregularity in the form of a ring-shaped groove.
Figure 17:
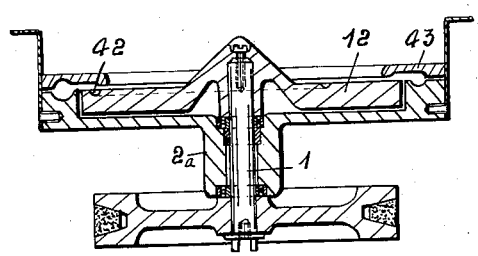

In the embodiment shown in FIGURES 16 and 17, a gyrostat conforming to the invention is also used as a pumping means; once again can be seen shaft 1, socket 2a, plate 12, while the uneven structure takes the form of a groove or hollow ring 42 fashioned in the latter; the whole is surrounded by a volute 43 serving to catch the liquids projected by hollow ring 42.

It should be noted that the agitator-ejector appliance which has just been described constitutes in itself, with its plate, the uneven structure fitted on the latter and its support, an independent assembly capable of being fitted on one of the walls of a tub for any desired manufacturing application.

Figure 18:
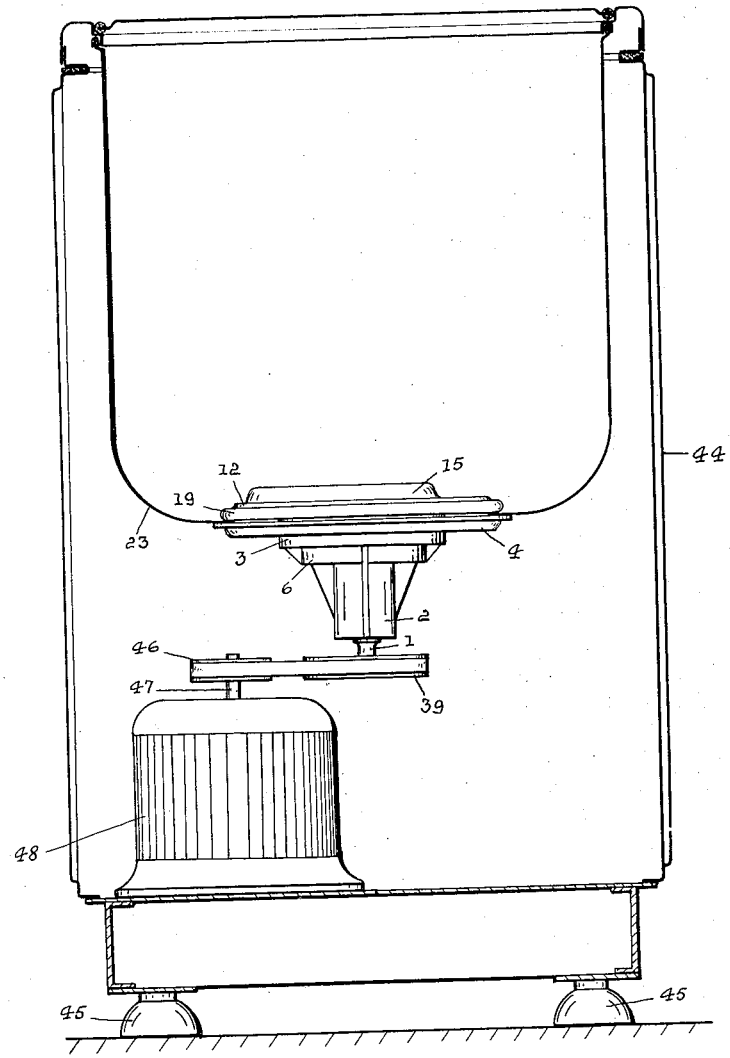
FIGURE 18 represents schematically, a washing machine in which a gyrostat conforming to the present invention is mounted.

FIGURE 18 represents a gyrostat conforming to the invention mounted into a washing machine of appropriate construction. The gyrostat is constituted by the rotary plate 12, the ring 15, and the stator cup 19 fixed on a bottom forming a cup 4, which carries the whole of the appliance. This cup 4 is mounted on the bottom of the tub 23 of the washing machine 44 supported on feet 45. The gyrostat is subjected to a rotary motion by its shaft 1 which is driven by the corresponding pulleys 39 and 46, the latter being carried by the shaft 47 of an electric motor 48.

What is claimed is:

1. A gyrostatic device for agitating and ejecting liquids or other substances of weak cohesion in the working chamber of an apparatus, the said device comprising a frame mounted on a wall on the inside of said working chamber, a central rotary shaft supported by the frame, a plate secured to said shaft for continuous rotation in either direction, said plate having an upper face, the upper face of said plate including means defining a generally circular single impelling surface extending generally transverse to the plane of the plate and largely enclosing the center of rotation of the plate at unequal distances thereby defining inwardly about the axis of rotation over its entire extent, an eccentric shallow basin constituting in part a large fixed area for the feeding of the liquid and in part a small area for the tangential ejection of the liquid located at the greatest distance from the center of rotation.

2. A gyrostatic device as claimed in claim 1, in which said impelling surface has an average diameter greater than the radius of the plate on which such impelling surface is located.

3. A gyrostatic device as claimed in claim 1, in which said shallow basin provides a discharge opening for the liquid at a point located at the greatest distance from the center of rotation of said plate.

References Cited in the file of this patent

UNITED STATES PATENTS

| | | |
|---|---|---|
| 2,071,622 | Gibson | Feb. 23, 1937 |
| 2,167,147 | Frantz | July 25, 1939 |
| 2,300,055 | McCabe | Oct. 27, 1942 |
| 2,630,696 | Castner | Mar. 10, 1953 |
| 2,636,442 | Roth | Apr. 28, 1953 |
| 2,770,122 | Jackson | Nov. 13, 1956 |
| 2,787,962 | Smith | Apr. 9, 1957 |

FOREIGN PATENTS

| | | |
|---|---|---|
| 140,207 | Australia | Feb. 12, 1951 |
| 149,467 | Sweden | July 16, 1952 |
| 751,469 | Great Britain | June 27, 1956 |
| 851,043 | Germany | Oct. 2, 1952 |
| 1,049,093 | France | Aug. 12, 1953 |
| 1,083,377 | France | June 23, 1954 |
| 1,119,813 | France | Apr. 9, 1956 |